(12) United States Patent
Alfani

(10) Patent No.: US 8,936,675 B2
(45) Date of Patent: Jan. 20, 2015

(54) PRECAST CEMENTITIOUS PRODUCTS WITH PHOTOCATALYTIC ACTIVITY

(75) Inventor: Roberta Alfani, Bergamo (IT)

(73) Assignee: Italcementi S.p.A., Bergamo (IT)

(*) Notice: Subject to any disclaimer, the term of this patent is extended or adjusted under 35 U.S.C. 154(b) by 158 days.

(21) Appl. No.: 12/309,963

(22) PCT Filed: Aug. 8, 2007

(86) PCT No.: PCT/IB2007/002283
§ 371 (c)(1),
(2), (4) Date: Feb. 3, 2009

(87) PCT Pub. No.: WO2008/017934
PCT Pub. Date: Feb. 14, 2008

(65) Prior Publication Data
US 2009/0266270 A1    Oct. 29, 2009

(30) Foreign Application Priority Data
Aug. 8, 2006   (IT) ............... MI2006A1594

(51) Int. Cl.
| C09C 1/36 | (2006.01) |
| C09C 1/00 | (2006.01) |
| C04B 14/00 | (2006.01) |
| C04B 7/00 | (2006.01) |
| C01G 23/047 | (2006.01) |
| E04F 13/14 | (2006.01) |
| C04B 28/02 | (2006.01) |
| E04F 15/08 | (2006.01) |
| E04F 19/00 | (2006.01) |
| B01J 35/00 | (2006.01) |
| B28B 3/20 | (2006.01) |
| C04B 111/00 | (2006.01) |
| C04B 111/20 | (2006.01) |

(52) U.S. Cl.
CPC ............... *E04F 13/141* (2013.01); *C04B 28/02* (2013.01); *E04F 15/08* (2013.01); *E04F 19/00* (2013.01); *B01J 35/004* (2013.01); *B28B 3/20* (2013.01); *C04B 2111/00129* (2013.01); *C04B 2111/2061* (2013.01)
USPC ............ 106/436; 106/733; 106/635; 423/610

(58) Field of Classification Search
USPC ......................................... 106/733
See application file for complete search history.

(56) References Cited

U.S. PATENT DOCUMENTS

| 3,904,341 | A | * | 9/1975 | Putti ..................... 425/382 R |
| 4,410,366 | A | * | 10/1983 | Birchall et al. ................ 524/5 |
| 6,409,821 | B1 | * | 6/2002 | Cassar et al. ................. 106/733 |

FOREIGN PATENT DOCUMENTS

EP    1 518 601 A1    6/2002

OTHER PUBLICATIONS

Hewlett, Peter. "Lea's Chemistry of Cement and Concrete". Butterworth-Heinemann, Fourth Ed. 2004. Retrieved from http://books.google.com/books?id=v1JVu4iifnMC&dq=oxygen+permeability+in+cement&source=gbs_navlinks_s.*

(Continued)

*Primary Examiner* — Kaj K Olsen
*Assistant Examiner* — Karam Hijji
(74) *Attorney, Agent, or Firm* — Abelman, Frayne & Schwab

(57) ABSTRACT

The present invention relates to new precast cementitious products with photocatalytic activity, and to a process to obtain them.

4 Claims, 1 Drawing Sheet

(56) References Cited

OTHER PUBLICATIONS

"Aggregate". Portland Cement Association. Mar. 6, 2004 [Retrieved on Feb. 24, 2012]. Retrieved from http://web.archive.org/web/20040306102004/http://www.cement.org/basics/concretebasics_aggregate.asp.*

"Application of Concrete". How Concrete Works. Jul. 9, 2006 [Retrieved on Jul. 1, 2013]. Retrieved from http://web.archive.org/web/20060709010009/http://www.howconcreteworks.com/application_of_concrete.html.*

* cited by examiner

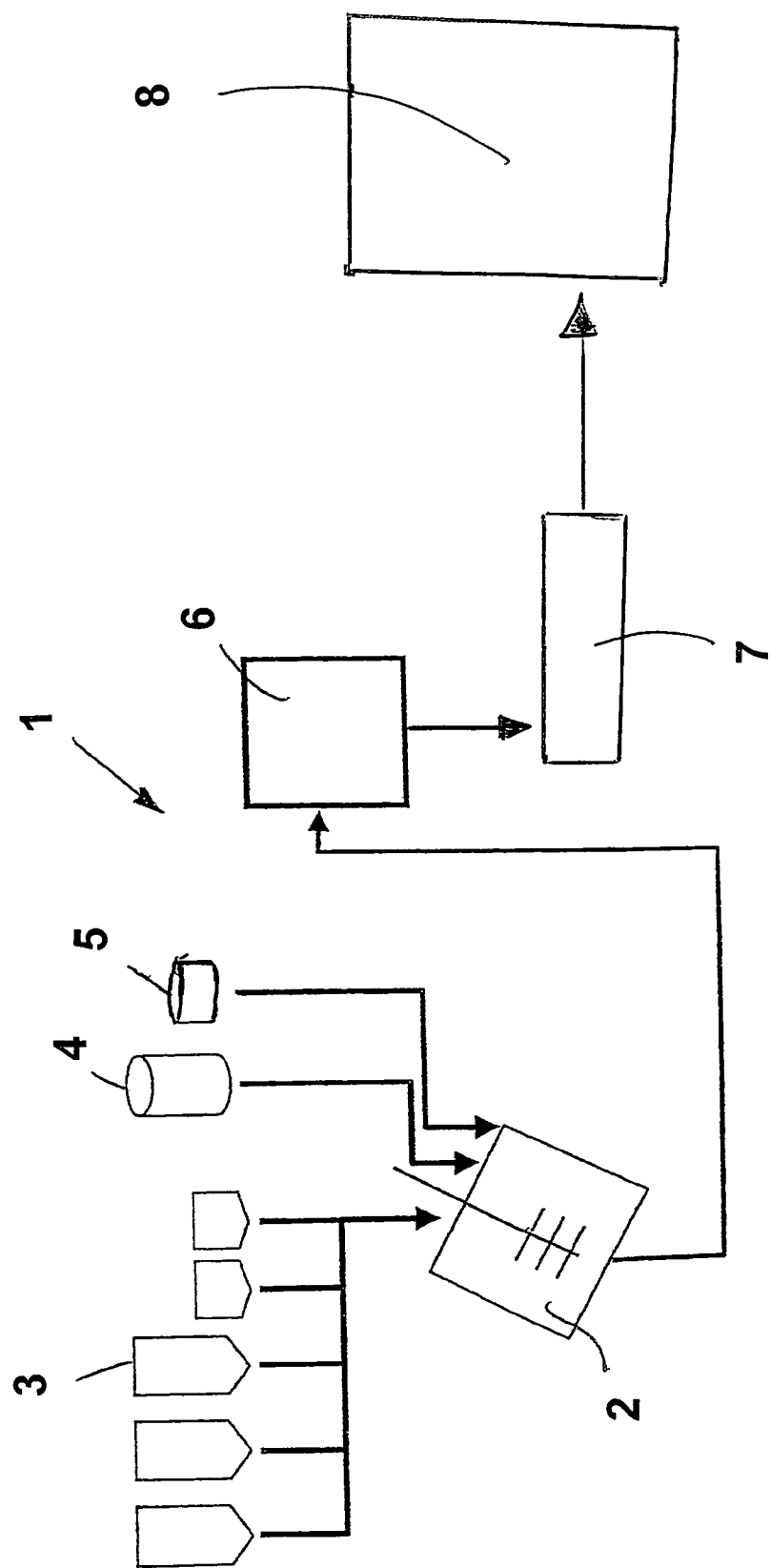

PRECAST CEMENTITIOUS PRODUCTS WITH PHOTOCATALYTIC ACTIVITY

FIELD OF THE INVENTION

The present invention relates to the field of precast products constituted by cementitious materials. There is described the production of precast cement products for use in the building sector, preferably for non-structural applications, and more preferably as cladding and covering elements, both of the horizontal and vertical type.

These cementitious products are often obtained by a cold extrusion process which offers considerable advantages: high production speeds and consequent costs reduction, the production of thinner products and consequently products lighter in weight compared to those obtained without extrusion. Examples of preferred embodiments are: roofing tiles, cladding panels for facades, fencing panels, interior covering elements, cornice and window sill profiles and street furniture, such as coverings for benches and steps, permanent formworks, baseboards, cable ducts, paving slabs and tiles, etc.

PRIOR ART

Patent application WO 95/33606 describes a process to obtain cementitious based products which have a definitive shape, stable in time, upon delivery from the extruder. Patent application by the applicant MI2005A002356 (Italcementi "Process for the production of piping made of a cementitious material having a circular section") relates to a process for the production by extrusion of piping made of a cementitious material having a circular section and fine thickness. Patent application EP 1234924 describes a process for preparing extruded cementitious tiles.

Patent application WO 98/05601 by the applicant describes for the first time the possibility of obtaining cementitious materials with photocatalysts constituted by transition metal oxides, in particular TiO2, prevalently in the form of anatase, and of producing architectural products with the cementitious materials thus modified. These products are characterized in that thanks to the photocatalytic properties they are capable, in the presence of light and atmospheric humidity, of oxidizing the organic and inorganic substances present in the environment which come into contact with the product, preserving the original aesthetic appearance for a longer time and reducing atmospheric pollution, in particular with regard to nitrogen oxides (NOx). Prior to this, the addition in mass of photocatalysts to cementitious materials was not deemed possible, and consequently surface application of photocatalysts on precast cementitious bases was preferred. For example, the patent JP 10219920 describes photocatalytic extruded cementitious materials where the photocatalytic part is represented by an upper layer applied separately to the extruded cementitious material. However, subsequent to the disclosure of WO 98/05601, studies of photocatalysis in cementitious matrix were intensified, and various limitations were discovered to the industrial use thereof in different spheres. For example, with regard to obtaining coverings, the patent US 5861205 claims photocatalytic self-locking composite blocks covered with a surface layer of cementitious material containing titanium dioxide with photocatalytic activity. This cementitious surface layer, 2-15 mm in depth, is characterized by high water permeability, >0.01 cm/sec, which is said to promote cleaning of substances (nitrates) produced in the photooxidation mechanism starting with atmospheric NOx. In U.S. Pat. No. 5,861,205, the cementitious surface layer is obtained according to different methods, which comprise both laminating to the base in a common mould and separate forming and subsequent joining of a surface layer and base. In the methods described in U.S. Pat. No. 5,861,205 it is common to limit the degree of compaction to which the surface layer is subjected during processing thereof, as both the presence of void volumes in the material (in the case in hand 10-40%) and the required water permeability must be guaranteed.

However, the methods of U.S. Pat. No. 5,861,205 are laborious as they require handling of two mixtures with different compositions to which different physical dimensions are imposed, as well as giving rise to problems regarding adhesion between the two different layers obtained therefrom.

TECHNICAL PROBLEM

In view of the problems set forth above, there is consequently the need to provide new precast products made of cementitious material with photocatalytic activity for use in the building sector, preferably for non-structural applications, and more preferably as cladding or covering elements which are not composite materials comprising different layers. This is because, especially in non-structural applications, the presence of a distinct base, theoretically capable of guaranteeing specific mechanical properties, is often not requested or unnecessary, given the low levels of stress to which the products are subjected during their useful service life. Therefore, it would be preferably to obtain precast cementitious products with photocatalytic activity, constituted by a single, homogenous material. This is also the case for structural applications, given that with the increase in loads, the problem of the two distinct layers becoming detached takes greater importance. Moreover, in many fields of application, such as tiles, but also other cladding or covering elements, there is also the need to provide precast cementitious products with photocatalytic activity which do not require a distinct sealing layer, which is thus suitable to prevent water from permeating through the product.

Moreover, there is also the need to provide a process for obtaining the new precast cementitious products with photocatalytic activity with the desired characteristics described above.

SUMMARY OF THE INVENTION

Now, the applicant of the present application has surprisingly found that the problems indicated above can be solved by providing new precast products made of cementitious material with photocatalytic activity, characterized by being extruded. Preferably, these new products exhibit an oxygen permeability coefficient ranging from $1 \times 10^{-20}$ to $1 \times 10^{-11}$ m$^2$, more preferably from $1 \times 10^{-19}$ to $1 \times 10^{-12}$ m$^2$, and even more preferably from $1 \times 10^{-18}$ to $10^{-14}$ m$^2$. The inventors of the present application have also found a new process for obtaining the aforesaid new products, which consists precisely in extrusion.

DESCRIPTION OF THE FIGURES

FIG. 1: block diagram of a possible production process of the precast cementitious products with photocatalytic activity described herein by means of extrusion.

DETAILED DESCRIPTION OF THE INVENTION

As set forth above, it was known from U.S. Pat. No. 5,861, 205 that in order for a cementitious product to have photocatalytic properties, it is necessary, among other things, for it to be sufficient water permeability. In fact, it is suggested by prior art that the water permeability coefficient must at least be greater than 0.01 cm/sec. However, utilizing the extrusion forming technique, an intrinsically high level of compaction of the material is reached, resulting in very low permeability values. Those skilled in the art also know that excessive compaction of the material does not promote photocatalytic activity. Therefore, as can be seen from the prior art (in particular U.S. Pat. No. 5,861,205 and JP 10219920)—despite the fact that extrusion is a technique becoming increasingly used in the production of precast cementitious products—those skilled in the art did not deem extrusion of cementitious materials a method suitable to develop/protect sufficient photocatalytic activities for the uses described herein. However, the applicant has now surprisingly found that it is possible to obtain precast cementitious products with photocatalytic activity also by means of extrusion. Moreover, it has been found that by means of the extrusion technique it is possible to obtain precast cementitious products with high photocatalytic activity, with reduced water permeability, and therefore utilizable, for example, as is as roofing tiles. Within the scope of the present invention, "precast cementitious products with photocatalytic activity" are intended as precast three-dimensional bodies, to be utilized in the building field, constituted by a solid material obtained by hydration of cementitious mixtures. These mixtures are intended as mixtures comprising the following materials:

I. a hydraulic binder,
II. a photocatalyst capable, in the presence of light, air and ambient humidity, of oxidizing organic and inorganic pollutants present in the environment,
III. one or more aggregates, and
IV. water.

"Hydraulic binder" or "binder" is intended as a pulverized material in solid state, dry, which when mixed with water provides plastic mixtures capable of setting and hardening, also under water, for example a cement. The "clinker" utilizable to prepare a binder for the present invention is any Portland cement thus defined according to the standard UNI EN 197.1, and thus a hydraulic material with at least two thirds in mass being composed of calcium silicates ($3CaO\ SiO_2$) and ($2CaO\ SiO_2$), the remaining part being $Al_2O_3$, $Fe_2O_3$ and other oxides.

The broad definition of "hydraulic binder" according to the present invention comprises cements (white, grey or pigmented) defined according to the aforesaid standard UNI EN 197.1, cements for retaining walls, cementitious binders and hydraulic limes as defined in Italian Law 26 May 1965 No. 595 and inorganic silicates.

The "photocatalyst" can be any type of substance capable, in the presence of light, oxygen and water, of oxidizing pollutants that come into contact with the surface of the cementitious compositions in hardened state, provided of course that it does not have a negative influence on the physical-mechanical properties of the cementitious compositions used in the invention. The preferred photocatalyst according to the present invention is titanium oxide or a precursor thereof, more typically "titanium oxide at least partly in the form of anatase". The expression "titanium oxide at least partly in the form of anatase" means that the particles of titanium oxide have an anatase structure of at least 5%, preferably 25%, more preferably 50% and even more preferably at least 70%, as percentage in weight of the total titanium oxide. In a particularly preferred aspect of the invention, the photocatalyst is constituted by anatase titanium particles of 100%, of nanometric size, which have a specific surface ranging from 5 to 350 $m^2/g$ and more specifically from 100 to 300 $m^2/g$. In a preferred aspect of the invention $TiO_2$ PC 105 by Millennium Inorganic Chemical is used. The expression "titanium oxide precursor" identifies any product which added to the clinker or to the hydraulic binder can form the $TiO_2$, if necessary with suitable heat treatments. An example of precursor is "titanium paste". Other examples of photocatalysts utilizable in the invention are the $TiO_2$ matrices doped with suitable atoms such as Fe(III), Mg(II), Mo(V), Ru(III), Os(III), Re(V), V(IV) and Rh(III). In particular, these atoms can replace, at atomic level, the Ti(IV) present in the $TiO_2$ matrix for at least 0.5%. The method to obtain these photocatalysts is described in the literature, for example in J. Phys. Chem. 1994, 98, 1127-34, Angew. Chemie 1994, 1148-9 and in Angew. Chemie Int., Ed. 1994, 33, 1091 and in the patent No. MI 99A001422 by the applicant. Further examples of photocatalysts are strontium titanate ($SrTiO_3$), calcium titanate, particularly effective in the presence of grey cements, and tungsten oxide ($WO_3$). The quantity of the photocatalysts utilized in the present invention is not critical, it nonetheless being desirable to use low quantities for cost reasons. By way of a non-limiting example, the photocatalyst is utilized in percentages ranging from 0.1% to 20% in weight, preferably 0.1-10%, more specifically 0.3-3%, for example 1.5% (preferably titanium dioxide prevalently in anatase form), said percentage in weight referring to the total weight of the inorganic components of the cementitious mixture. The applicant markets photocatalytic cements with the trademarks indicated in the examples below where the quantity of TiO2 is less than 5% in weight with respect to the binder. The photocatalyst is added in mass together with all the other components: therefore it is distributed throughout the entire mass of the precast product, i.e. also in the inner and deep layers and not only on the surface thereof. The term "inorganic or organic pollutants present in the environment" is intended by way of example as organic pollutants such as aromatic polycondensates, aldehydes, benzene, black carbon comparable to PM10, and inorganic pollutants such as nitrogen (NOx) and sulfur (SOx) oxides and carbon monoxide (CO).

"Aggregates", "inert materials" or "inert aggregates", synonymous with one another according to the present invention, can be fine aggregates, such as sand and fillers and are defined in the standard UNI EN 206.

Optionally, the mixture can also contain one or more further usual auxiliary substances in the field, in particular rheology modifiers, setting regulators, additives such as water retainers, cohesion enhancers, fluidizers, plasticizers, lubricants and retardants or charges of mineral or pozzolanic origin, fibers of various nature such as polymer, metal, glass, carbon, pigments or the like.

With reference to FIG. 1, the steps of a preferred embodiment of the process or the production of new products made of cementitious material with photocatalytic activity described herein are now illustrated schematically.

A mixer (2) is fed with:
   a cement based solid component, which typically comprises one or more components chosen from cement, sand, aggregates, charges of mineral or pozzolanic origin, fibers of various nature such as polymer, metal, glass, carbon and viscosifying additives, pigments, stored in a plurality of dosing devices (3) preferably of gravimetric type,
   water (4), stored in a dosing device for liquids,
   any additives (5), in liquid or solid form.

The solid phase components are mixed in a mixer typically of intensive type 2 for a time preferably ranging from 30 seconds to 15 minutes, as a function of the characteristics of the mixer and of the external temperature, until obtaining a homogenous system. Subsequently, the liquid components, including the water, are added and mixing continues for a time typically ranging from 30 seconds to 10 minutes, again as a function of the characteristics of the mixer and of the external temperature. At the end of the mixing step the mixture can have different semi-solid forms which range from damp powder to small granular agglomerates to a consistency of a cohesive and homogenous paste.

The system thus obtained can be collected in an intermediate storage bin, and can be sent via transport means to a mixing machine or mixer homogenizer (6), before the extrusion step (7). According to a preferred embodiment, the system obtained under the different semi-solid forms is collected in a bin and sent on belts to feed an extrusion or forming system. Extrusion step is intended as any forming process of the material by means of which it is possible to continuously obtain products of specific shape. According to the present invention, "extrusion" is intended as any continuous process by means of which the cement-based solid mixture is fed through a section with specific geometry by means of generating pressure. Therefore this term comprises both an extrusion process using classic screw or piston extruders and the feed process with reels and augers that push the material through a slit compacting it. The extrusion step is typically carried out imparting suitable pressures to the material while it is forced to pass through a device that allows the desired geometry to be obtained, commonly called screw or piston type extrusion die. The extrusion step can be carried out in controlled temperature conditions, by means of a cooling system, in order to guarantee that the workability of the mixtures in relation to the hydration kinetics of the cement is correctly maintained. The extruded product is then cut according to the desired dimensions and sent to an ageing/curing (8) and subsequent storage system.

For example, special cementitious mixtures are utilized in the production of tiles, as described by Boltri Pierangelo in "Specializzata Edilizia", 1992, No. 16, pages 454-460, who also emphasizes the function of compaction performed by extrusion, important to obtain the desired final properties.

Within the scope of the processes described herein, it is preferable to regulate the oxygen permeability of the products according to the present invention, in particular the oxygen permeability coefficient measured according to the standard UNI 1164, to values ranging from $1\times10^{-20}$ to $1\times10^{-11}$ $m^2$, more preferably from $1\times10^{-19}$ to $1\times10^{-12}$ $m^2$, and even more preferably from $1\times10^{-18}$ to $10^{-14}$ $m^2$, which allows the photocatalytic activity of the precast products described herein to be maintained high.

The oxygen permeability of the products can be regulated by those skilled in the art in a manner known per se, i.e. acting on various parameters, such as the pressure generated during extrusion, the ratio between water and hydraulic binder, or the grain size and/or distribution of the grain sizes of the aggregates, which are known to influence the degree of compaction to which the extruded material is subjected. As a rule, for the products in question here, it is preferable for the pressures applied in extrusion not to exceed 50 bar and for the water-cement ratios to be greater than 0.20.

In the products according to the present invention, measurement of the oxygen permeability coefficient according to UNI 11164 is preferable to measurement of the water permeability coefficient, as it is known from the literature [1] that by penetrating cementitious materials, especially if relatively compact such as those of the present invention, water can cause interactions with the cementitious material which then in turn influence the measurements. Instead, gas permeability is not subject to the risk of artifacts of this type, and in the literature [1,2] there are conversion relations of the various sizes measured which take account of the various determining physical parameters. For example, the oxygen permeability coefficient, unlike that of water, measured in m/s, has dimensions in $m^2$, as it is calculated in stationary laminar flow conditions, taking into account the compressibility of the gas (said compressibility being instead unimportant when the fluid utilized to measure permeability is a liquid). The literature states that a water permeability value of $1\times10^{-4}$ m/s corresponds to an oxygen permeability of $1\times10^{-11}$ $m^2$.

The inventors of this application have in fact surprisingly found that with the production conditions described herein, i.e. extrusion and preferably suitable control of the oxygen permeability coefficient, it is possible to obtain high photocatalytic activities which are often close to total elimination of NOx according to the experimental layout described in the application MI2004A000563 filed on 23 Mar. 2004 by the same applicant, said experimental layout corresponding to the current draft UNI standard, currently being drawn up, with provisional code U87003040.

This proves that even more compact materials than those described in the art, with low water permeability, or for example in the case of tiles, even "impermeable" in accordance with the specific standard 8635/10 that simulates rain (see article by Boltri supra), allow more than half the maximum theoretical amount of NOx reduction to be attained and therefore maintain a high photocatalytic activity.

LITERATURE CITED

[1] H. Loosveldt, et al.—Experimental study of gas and liquid permeability of a mortar—Cement and Concrete Research 2002, 32, 1357-1363.
[2] P. A. Claisse, et al.—In situ measurement of the intrinsic permeability of concrete—Magazine of Concrete Research 2003, 55 (2), 125-132.

EXAMPLES OF EMBODIMENT

Example 1

The solid components relative to the materials indicated in table 1 were mixed in a Galletti type intensive mixture for 3 min.

TABLE 1

| COMPONENTS | % in weight |
| --- | --- |
| Cement TX Aria Italcementi | 43.8 |
| Sand | 43.8 |
| Fibers | 1.1 |
| Additives | 1.2 |
| Water | 10.2 | water/cement = 0.23

After this step water and a fluidifying additive were added and mixing continued for a further 3 min.

After this mixing operation the system had a moist granular formula. The solid mass was sent via conveyor belts to a twin screw extruder.

During the extrusion step the material was compacted and the pressure read was 30 bar at the temperature of 15° C. The product delivered from the extruder was an external cladding panel for industrial buildings 60 cm in length and 3.5 m in width. With the composition of example 1 an external cladding panel for buildings was produced.

The oxygen permeability measured according to the standard UNI 11164 was $3 \times 10^{-18}$ m$^2$.

The photocatalytic activity measured with the method according to the draft standard UNI U87003040 was as follows: NOx reduction of 85%.

Example 2

Substantially following the process described in example 1, but utilizing the components described in Table 2, a roofing tile was obtained by extrusion forming.

TABLE 2

| COMPONENTS | % in weight |
|---|---|
| Cement TX Aria Italcementi | 34.4 |
| Sand | 55 |
| Additives | 0.6 |
| Water | 10.0 | water/cement = 0.29

The process differed from that of example 1 as the forming step was performed utilizing a moving lower support and then feeding the material through a slit with the same thickness as the geometry of the tile. The pressure read was 20 bar at a temperature of 15° C.

The oxygen permeability measured according to the standard UNI 11164 was $4 \times 10^{-16}$ m$^2$.

The photocatalytic activity measured with the method according to the draft standard UNI U87003040 was as follows: NOx reduction of 75%.

Example 3

Substantially following the process described in example 2, but utilizing the components described in Table 3, a covering element for a bench was produced.

TABLE 3

| COMPONENTS | % in weight |
|---|---|
| Cement TX Arca Italcementi | 30 |
| Sand | 60 |
| Pigment | 0.3 |
| Water | 9.7 | water/cement = 0.32

The pressure reading was 25 bar at a temperature of 15° C.
The oxygen permeability measured according to the standard UNI 11164 was $1.2 \times 10^{-14}$ m$^2$.
The photocatalytic activity measured with the method according to the draft standard UNI U87003040 was as follows: NOx reduction of 68%.

Example 4

Substantially following the process described in example 1, but utilizing the components described in Table 4, a window sill was produced.

TABLE 4

| COMPONENTS | % in weight |
|---|---|
| Cement TX Arca Italcementi | 50.5 |
| Sand | 35 |
| Mineral additive | 1.0 |
| Fibers | 0.5 |
| Additives | 1.0 |
| Water | 12.0 | water/cement = 0.24

The pressure reading was 35 bar at a temperature of 20° C.
The oxygen permeability measured according to the standard UNI 11164 was $10^{-18}$ m$^2$.
The photocatalytic activity measured with the UNI method was as follows: NOx reduction of 80%.

Example 5

(For Comparison)

Substantially following the process described in example 1, but utilizing the components described in Table 5, a baseboard element was produced.

TABLE 5

| COMPONENTS | % in weight |
|---|---|
| Cement TX Aria Italcementi | 32 |
| Sand | 58 |
| Mineral additive | 2.5 |
| Additives | 1.5 |
| Water | 6.0 | water/cement = 0.19

The pressure reading was 50 bar at a temperature of 20° C.
The oxygen permeability measured according to the standard UNI11164 was $0.5 \times 10^{-20}$ m$^2$.
The photocatalytic activity measured with the method according to the draft standard UNI U87003040 was as follows: NOx reduction of 40%.

The invention claimed is:

1. A process for preparing a pre-cast cementitious product—with improved photocatalytic activity constituted by a single homogenous cementitious material throughout the entire mass of which a catalyst is distributed, consisting of the following steps:
    a. mixing components consisting of a cement, a photocatalyst, fine aggregate and water to a semi-solid form; and
    b. extruding such semi-solid mixture under a pressure not exceeding 50 bar to impart an oxygen permeability coefficient ranging from 1×10-18 to 1.2×10-14 m2 to the extruded precast cementitious product,
    thus obtaining an improved photocatalytic activity measured according to the standard UNI U87003040 corresponding to an NOx reduction of from 68% to 85%.

2. The process according to claim 1, wherein the extruded precast cementitious product is a cladding or covering element for the building sector, of horizontal or vertical type.

3. The process according to claim 1, wherein the extruded precast cementitious product is an element for street furniture.

4. The process according to claim 1, wherein the extruded precast cementitious product is in the form of a tile, cladding panel for facade, fencing panel, interior covering element, cornice profile, window sill, covering for benches or steps, permanent formwork, baseboard, cable duct, paving slab or tile, in the urban or building sector, or for non-structural applications.

* * * * *